US009633148B2

(12) United States Patent
Dai et al.

(10) Patent No.: US 9,633,148 B2
(45) Date of Patent: Apr. 25, 2017

(54) STATIC TIMING ANALYSIS IN CIRCUIT DESIGN

(71) Applicant: International Business Machines Corporation, Armonk, NY (US)

(72) Inventors: Hongwei Dai, Shanghai (CN); Yang Liu, Shanghai (CN); Jia Niu, Shanghai (CN); Peng Ou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/854,073

(22) Filed: Sep. 15, 2015

(65) Prior Publication Data
US 2016/0154915 A1    Jun. 2, 2016

(30) Foreign Application Priority Data

Nov. 28, 2014    (CN) .......................... 2014 1 0712156

(51) Int. Cl.
*G06F 17/50* (2006.01)
*G01R 31/317* (2006.01)

(52) U.S. Cl.
CPC .... *G06F 17/5031* (2013.01); *G01R 31/31725* (2013.01); *G01R 31/31726* (2013.01); *G06F 17/50* (2013.01); *G06F 17/505* (2013.01); *G06F 17/5045* (2013.01); *G06F 17/5059* (2013.01); *G06F 2217/84* (2013.01)

(58) Field of Classification Search
CPC ............. G06F 17/5031; G06F 2217/84; G06F 17/505; G06F 17/5045; G06F 17/5059; G06F 17/50; G01R 31/31725
See application file for complete search history.

(56) References Cited

U.S. PATENT DOCUMENTS

| | | | | |
|---|---|---|---|---|
| 6,058,252 A | * | 5/2000 | Noll | G06F 17/5068 716/113 |
| 6,453,446 B1 | * | 9/2002 | van Ginneken | G06F 17/505 716/114 |
| 6,760,894 B1 | | 7/2004 | Yalcin et al. | |
| 6,834,379 B2 | * | 12/2004 | Kidd | G06F 17/5031 716/108 |
| 7,587,690 B1 | * | 9/2009 | Siarkowski | G06F 17/504 716/108 |

(Continued)

OTHER PUBLICATIONS

Oh et al.; "Efficient logic-level timing analysis using constraint-guided critical path search"; Year: 1996; IEEE Transactions on Very Large Scale Integration (VLSI) Systems; Volume: 4, Issue: 3; pp. 346-355.*

Stewart et al.; Static timing analysis using interval constraints: Year: 1991; Computer-Aided Design, 1991. ICCAD-91. Digest of Technical Papers., 1991 IEEE International Conference on; pp. 308-311.*

(Continued)

*Primary Examiner* — Helen Rossoshek
(74) *Attorney, Agent, or Firm* — L. Jeffrey Kelly (57) ABSTRACT

A method of for calculating a path delay in static timing analysis (STA) for a circuit design includes determining a connectivity between a first device and a second device in a path of the circuit design, generating a delay constraint associated with the first device and the second device based on the connectivity, the delay constraint specifying a correlation between a first device delay of the first device and a second device delay of the second device, and calculating a path delay of the path based on the first device delay and the second device delay that satisfies the delay constraint.

16 Claims, 8 Drawing Sheets

(56) References Cited

U.S. PATENT DOCUMENTS

| | | | |
|---|---|---|---|
| 7,647,220 B2 * | 1/2010 | Kulshreshtha | G06F 17/5022 703/19 |
| 7,971,169 B1 | 6/2011 | Tetelbaum et al. | |
| 7,984,354 B2 * | 7/2011 | Goswami | G01R 31/318547 703/13 |
| 8,196,076 B2 * | 6/2012 | Chander | G06F 17/5031 716/107 |
| 8,640,066 B1 * | 1/2014 | Gupta | G06F 17/505 716/102 |
| 8,832,616 B2 * | 9/2014 | Chang | G06F 17/5031 716/108 |
| 8,863,052 B1 * | 10/2014 | Dhuria | G06F 17/5036 716/108 |
| 2010/0313176 A1 | 12/2010 | Takahashi et al. | |
| 2011/0252393 A1 * | 10/2011 | Sripada | G06F 17/5031 716/134 |
| 2013/0159952 A1 * | 6/2013 | Niu | G06F 17/5068 716/113 |
| 2015/0026653 A1 * | 1/2015 | Stevens | G06F 17/505 716/108 |

OTHER PUBLICATIONS

Ashar et al., "Functional Timing Analysis Using ATPG", Short Papers, IEEE Transactions on Computer-Aided Design of Integrated Circuits and Systems, vol. 14, No. 8, Aug. 1995, pp. 1025-1030.

Brand et al., "Timing Analysis Using Functional Analysis", IEEE Transactions on Computers, vol. 37, No. 10, October 1988, pp. 1309-1314.

Du et al., "On the General False Path Problem in Timing Analysis", 26th ACM/IEEE Design Automation Conference®, 1989, Paper 35.1, pp. 555-560.

Liu, "Input-Aware Statistical Timing Analysis for VLSI Delay Test and Average Design", Circuits and Systems (MWSCAS), 2014, 4 pages.

Tsukiyama et al., "A Statistical Static Timing Analysis Considering Correlations Between Delays", 2001 IEEE, pp. 353-358.

Pending CN Application No. 201410712156.2, filed on Nov. 28, 2014, entitled: "Method and System for Static Timing Analysis in Circuit Design", 31 pages.

* cited by examiner

STATIC TIMING ANALYSIS IN CIRCUIT DESIGN

BACKGROUND

Embodiments of the present invention generally relate to circuit design, and more specifically to a method and system for static timing analysis in circuit design.

Static Timing Analysis (STA) is an important part of circuit design. The main purpose of a STA process is calculating various timing performance indexes of circuit design by analyzing path delay in order to detect paths violating timing requirements. Calculating path delay of respective paths in circuit design is fundamental to STA. A path typically includes one or more devices, e.g., a gate. Path delay may be determined based on device delay in the path. Device delay may be pre-determined and stored, for example, stored in a standard cell library that is accessible and available during the STA process.

It is known that device delay always varies with different input patterns/conditions. With XOR3, for example, a delay from its first input to the output is always related to input values at the second input and third input. Specifically, if the input patterns at the second input and third input are "11" (i.e., the two input values are both "1"), "10" or "01" (i.e., one of the two input values is "0," while the other is "1") and the input pattern is "00" (i.e., the two input values are both "0"), the delays from the first input to the output are always different. The same scenario may also exist in other circuit devices.

In a traditional STA method, path delay is obtained by summing maximum device delays of respective devices in the path. In other words, each individual device is supposed to reach the maximum device delay. The path delay derived in this way will be subsequently used to determine whether the path satisfies the timing needs. However, the path delay derived from the traditional STA method of maximum device delay is always "pessimistic." In other words, the actual maximum delay of the path may be less than the calculated path delay. For example, in certain cases, some devices in the path may reach the maximum device delay simultaneously. The pessimistic path delay calculation affects the accuracy of STA and likely implies a time violation that may not occur in reality. To this end, unnecessary efforts may be required to optimize the circuit design, which may likely increase the running time and wafer size.

SUMMARY

Generally, embodiments of the present invention may provide a solution for static timing analysis in circuit design.

According to one aspect of the present invention, a method of calculating a path delay in static timing analysis (STA) for circuit design may include determining connectivity between a first device and a second device in a path of the circuit design; generating a delay constraint associated with the first device and the second device based on the connectivity, the delay constraint specifying a correlation between a first device delay of the first device and a second device delay of the second device; and calculating a path delay of the path based on the first device delay and the second device delay satisfying the delay constraint.

According to another aspect of the present invention, a system for calculating a path delay in static timing analysis (STA) for circuit design may include a connectivity determining unit configured to determine connectivity between a first device and a second device in a path of the circuit design; a delay constraint generating unit configured to generate a delay constraint associated with the first device and the second device based on the connectivity, the delay constraint specifying a correlation between a first device delay of the first device and a second device delay of the second device; and a path delay calculating unit configured to calculate a path delay of the path based on the first device delay and the second device delay satisfying the delay constraint.

According to embodiments of the present invention, a delay constraint for connected devices using connectivity among the devices may be provided. Based on such delay constraint, device delay (e.g., maximum device delay) or its pair which may not occur in reality may be determined. Therefore, device delay which may unlikely occur when calculating the path delay may be excluded. In this way, pessimism in path delay calculation may be effectively eliminated, thereby enhancing the accuracy of STA and further improving the efficiency of timing optimization. Other features and advantages of the present invention will become easily comprehensible through the following description.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this invention will be thorough and complete and will fully convey the scope of this invention to those skilled in the art. In the description, details of well-known features and techniques may be omitted to avoid unnecessarily obscuring the presented embodiments.

Figure 1:
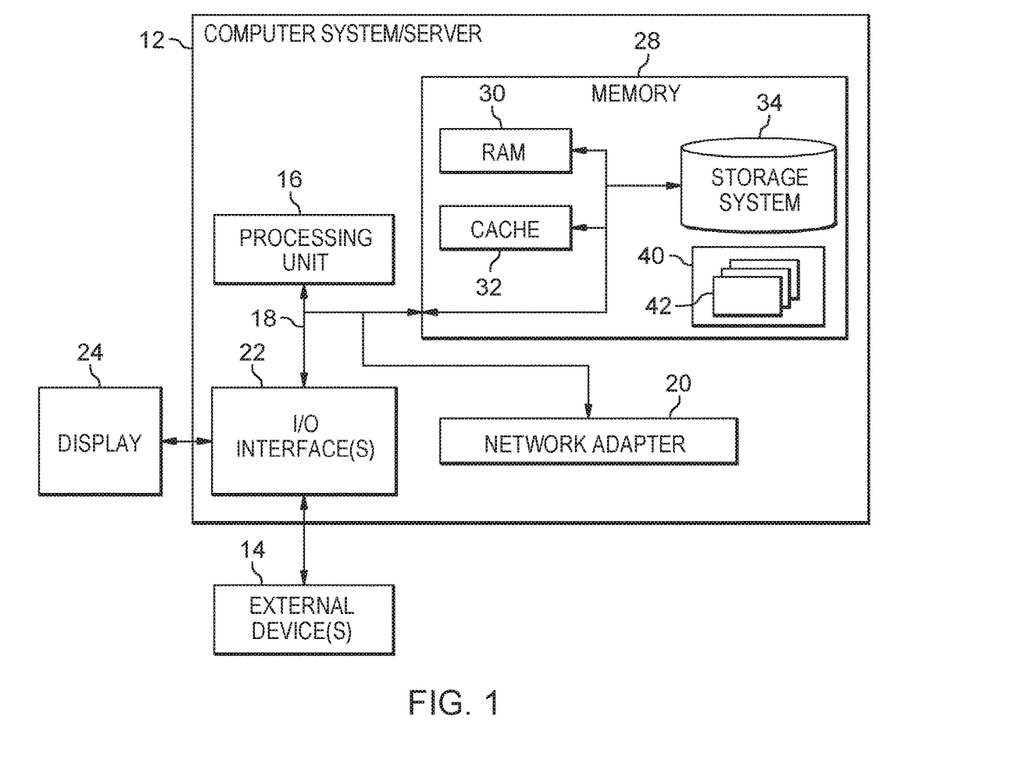
FIG. 1 shows an exemplary computer system/server which is applicable to implement embodiments of the present invention.

Referring now to FIG. 1, an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory (or memory) 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It is to be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "include" or a similar expression indicates an open inclusion, i.e., "including, but not limited to . . . . " The term "plural" or a similar expression indicates "two or more." The term "one embodiment" indicates "at least one embodiment." The term "another embodiment" indicates "at least one another embodiment." Definitions of other terms will be provided in the description below.

In order to explain the mechanism and principle of the present invention more clearly, problems and defects in the traditional STA will be first analyzed. In the traditional STA, each device in the analyzed path is supposed to reach the maximum device delay. Afterwards, an estimation of the path delay may be achieved by summing the maximum device delays of these devices according to a connection sequence. However, as mentioned above, a path delay obtained in this way always has an apparent "pessimism." Through mass experiments and research, it has been found that device delays of connected devices in the path have constrains to one another. Such constraints in turn affect the path delay of the whole path. Currently, path delay is estimated without taking the constraints between the various devices into account.

Figure 2:
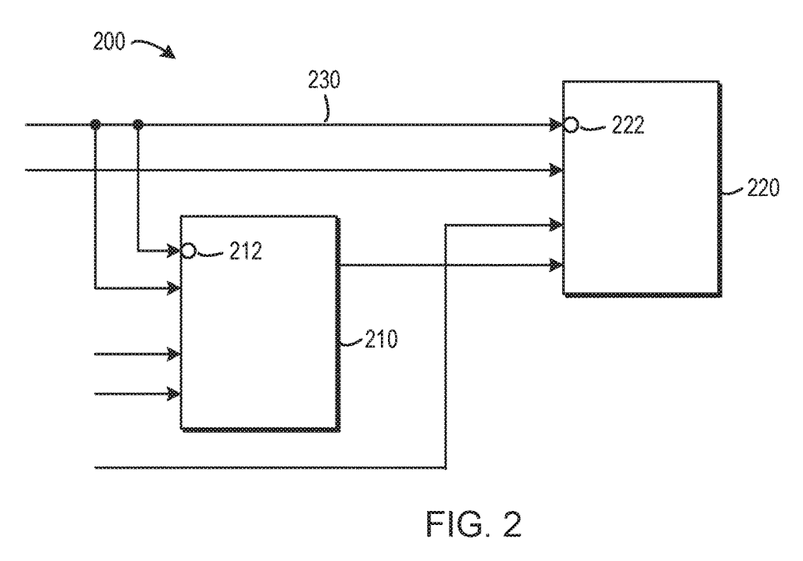
FIG. 2 shows a schematic diagram of two devices having a common input in the path of circuit design, according to an embodiment of the present invention.

As shown in FIG. 2, in one path 200 of a circuit design, devices 210 and 220 are connected each other. Suppose it is determined based on the standard cell library that the condition for the device 210 to reach its maximum device delay is that the input value of its input 212 is "1," while the condition for the device 220 to reach its maximum device delay is that the input value of its input 222 is "0." However, in the path 200, the input 212 of the device 210 and the input 220 of the device 220 are connected to a common wire 230. In this case, it may be difficult to determine that the input 212 of the first device 210 receives the input value "1," while the input 222 of the second device 220 receives the input value "0." Therefore, it may be unattainable for the first devices 210 and 220 to reach the maximum device delay simultaneously.

Because of such pessimistic path delay estimation, the path originally satisfying the design requirements may be mistakenly identified as violating the timing requirements; a path that only slightly violated the time requirements originally might be mistakenly identified as rather seriously violating the timing requirements. Accordingly, unnecessary time and effort has to be taken to perform timing optimization with respect to these paths which from the perspective of design time and cost it may be undesirable.

In order to overcome the above and other potential problems in the traditional STA, embodiments of the present invention consider the connectivity between devices in the path delay calculation of the STA. By generating a delay constraint representing the device correlation based on the connectivity between devices, the pessimism of traditional path delay estimation may be substantially reduced, which may in turn improve the accuracy of STA.

Figure 3:
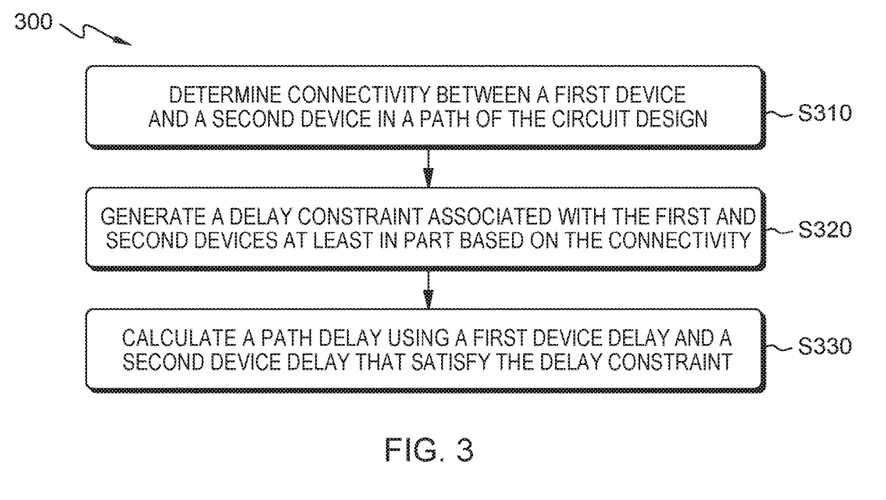
FIG. 3 shows a schematic flow diagram of a method of calculating a path delay in the STA, according to an embodiment of the present invention.

Referring now to FIG. 3, a schematic flow diagram of a method 300 for calculating path delay in an STA is shown, according to embodiments of the present invention. As an illustration only, without intent of limitation, two interconnected devices in the path may be described. However, it may be understood that the method 300 may be applicable to a path including any number of devices.

As shown in the figure, the method 300 starts from step S310, where connectivity between two devices is determined. Afterwards, the method 300 proceeds to step S320, where a delay constraint associated with a first device and a second device is generated at least in part based on the connectivity between the first device and the second device determined at step S310.

The term "device" used here mainly refers to a logic device in the path, e.g., a gate device. Examples of the gate may include, but are not limited to, AND gate, OR gate, NOT gate, XOR gate, NAND gate, AND-OR gate, etc. Any currently known or future developed logical devices may be used in combination with embodiments of the present invention, and the scope of the present invention is not limited in this aspect.

As may be known by those skilled in the art, each device in the circuit path has a fixed device delay. Device delay may have a plurality of possible candidate values. In the case of a different pattern, device delay of a device varies between these candidate values. As an example, for an XOR gate having three inputs, the delay from its first input to the output may vary with the input patterns of the second input and third input. The input values of the second input and third input have four possible input patterns, namely, "00," "01," "10," and "11." Each input pattern may likely cause the device delay to have different values. Of course, dependent on the type of a device, it is also possible that the value of device delay maintains unchanged in different input patterns.

Figure 4:
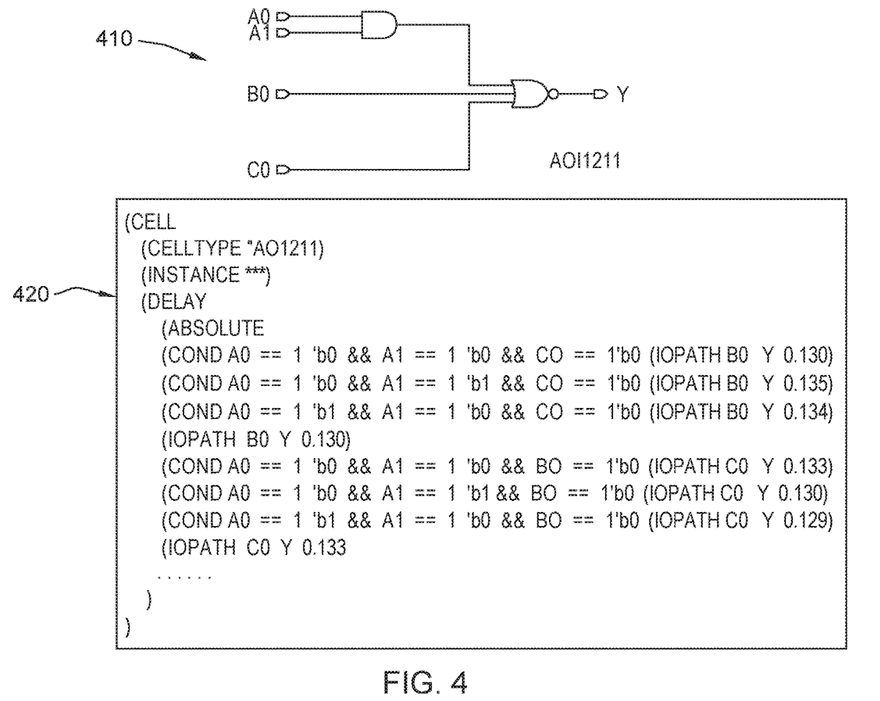
FIG. 4 shows a schematic diagram of a part of a standard cell library available for storing device delay information, according to an embodiment of the present invention.

Generally, candidate values of device delay of a device and its corresponding input pattern may be pre-determined and stored. For example, the information about device delay may be stored in a standard cell library. As an example, FIG. 4 shows a schematic diagram of a part of a standard cell library. In the illustrated example, a plurality of candidate values of device delay of the circuit element 410 with a device type "AOI211" and their corresponding input patterns are stored in a code segment 420 of the standard cell library. Such information stored in the standard cell library may be accessed and used in the STA.

According to embodiments of the present invention, a delay constraint associated with a first device and a second device may be for specifying a correlation between device delays of the first and second device. Specifically, for any value pair including a device delay of a first device (called "first device delay") and a device delay of a second device (called "second device delay"), it may be only considered in calculating the path delay under the condition of satisfying the delay constraint. Otherwise, any value pair of device delays that do not satisfy delay constraint may be excluded from the path delay calculation. In other words, the delay constraint generated in step S320 may limit the values of respective device delays of the first device and second device based on the connectivity between the first device and the second device as determined in step S310 when calculating the path delay. Several exemplary embodiments of the present invention will be described hereinafter.

In one embodiment, it may be determined in step S310 whether the first device and the second device have a common input. More specifically, it may be determined whether any input of the first device and any input of the second device are connected to the same wire or directly connected to each other. For example, in the scenario shown in FIG. 2, the input 212 of the first device 210 and the input 222 of the second device 220 are connected to the same wire; therefore, they may be regarded as connected to each other.

In response to determining that the first input of the first device and the second input of the second device are directly connected at step S310, a corresponding delay constraint (hereinafter "first delay constraint") may be generated in step S320. The first delay constraint specifies that in the path delay calculation of STA, an input value of a first input corresponding to a value of the first device delay of the first device should be equal to an input value of a second input corresponding to a value of the second device delay of the second device. Only when the first delay constraint is satisfied, the corresponding value pair of the device delay is possible. Otherwise, any value pair of device delays violating the first delay constrain should be excluded when calculating the path delay.

For the sake of discussion, reference is still made to the example shown in FIG. 2. According to embodiments of the present invention, a first constraint may be generated for the first device 210 and the second device 220, which specifies that an input value of an input 212 corresponding to a value of the device delay of the first device 210 should be equal to the input value of the input 222 corresponding to the value of the device delay of the second device 220.

With the maximum device delay as an example, suppose it is determined based on the information in the standard cell library that the input 212 when the first device 210 reaches its maximum device delay is "1," and the input 222 when the second device 220 reaches its maximum device delay is "0." In this case, the value pair of the maximum device delays of the first device 210 and second device 220 does not satisfy the first constraint, because the input values of the inputs connected to each other on the first device and second device are different. Therefore, the first device and the second device cannot reach their respective maximum device delays simultaneously. Correspondingly, as will be described in detail below, when calculating the path delay, the first device 210 and the second device 220 may be prohibited from taking their maximum device delays simultaneously.

On the contrary, if it is determined based on the data in the standard cell library that the input 212 when the first device 210 reaches its maximum device delay is "1," and the input 222 when the second device 220 reaches its maximum device delay is also "1," then the value pair satisfies the first constraint (because now the input values of the inputs connected to each other on the first device and second device are equal). Therefore, when calculating the path delay, the first device 210 and the second device 220 may reach their respective maximum device delays simultaneously.

An exemplary embodiment of the present invention will be described still with reference to FIG. 3. Alternatively or additionally, in one embodiment, it may be determined in step S310 whether the first device and the second device have an input associated with one or more identical registers. As known by those skilled in the art, in a circuit, besides a logical operation device such as gate, a register acting as a memory element may also be present. In some cases, the inputs of different logical devices are not directly connected to each other, but associated with one or more common registers.

Figure 5:
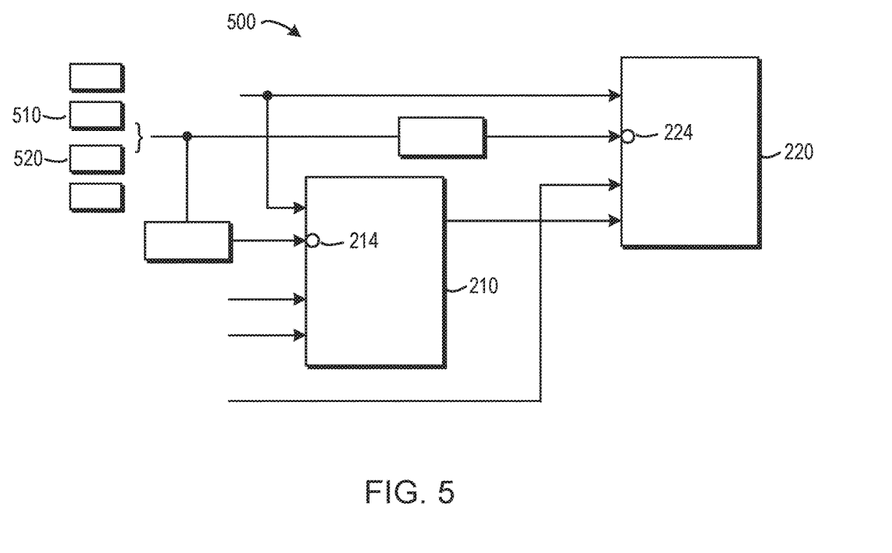
FIG. 5 shows a schematic diagram of two devices associated with a common register in a path of circuit design, according to an embodiment of the present invention.

Referring now to FIG. 5, a schematic diagram of devices associated with a common register is shown, according to embodiments of the present invention. In path 500 illustrated in FIG. 5, an input (called "third input") 214 of the first device 210 and an input (called "fourth input") 224 of the second device 220 are not directly connected. However, the inputs 214 and 224 are both associated with common registers 510 and 520. It should be noted that, in the description below, one or more registers all associated with the third input of the first device and the fourth input of the second device are generally referred to as "common registers."

At this point, a corresponding delay constraint may be generated in step S320, called "second delay constraint." The second delay constraint specifies that a status (called "a first status") of common registers (in this example, registers 510 and 520) corresponding to the first device delay of the first device 210 should be identical to a status (called "a second status") of the common register corresponding to the second device delay of the second device 220.

Similar to the first delay constraint, only when the value pair of the device delays of the first device 210 and second device 220 satisfies the second delay constraint, will the value pair be likely considered in calculating the path delay. Otherwise, the value pair of any device delay violating the second delay constraint will be excluded of calculating the path delay.

As an example, still consider the maximum device delay of the device. Suppose it is determined based on the data in the standard unit library: a status of registers 510 and 520 when the first device 210 reaches its maximum device delay is "00" or "10," and the status of the registers 510 and 520 when the second device 220 reaches its maximum device delay is "01." At this point, a first status of the common register needed for the first device 210 to reach the maximum device delay is very likely not identical to the second status of the common register needed for the second device 220 to reach the maximum device delay (the intersection therebetween is empty). Therefore, it may be determined that the first device 210 and the second device 220 cannot reach the maximum device delay simultaneously.

On the contrary, if the status of the registers 510 and 520 when the first device 210 reaches its maximum device delay is "00" or "10," and the status of the registers 510 and 520 when the second device 220 reaches its maximum device delay is "10," it is likely that the first device 210 and the second device 220 will reach the maximum device delay simultaneously (when the status of the registers 510 and 520 is "10"). Thus, the pair of the maximum device delays of the two devices may be considered in path delay calculation.

In some other embodiments, besides the device connectivity determined in step S310, when determining the delay constrain in step S320, one or more other related factors may be considered. For example, in one embodiment, the delay constraint may be determined based on the connectivity of the devices and the type of at least one device.

Figure 6:
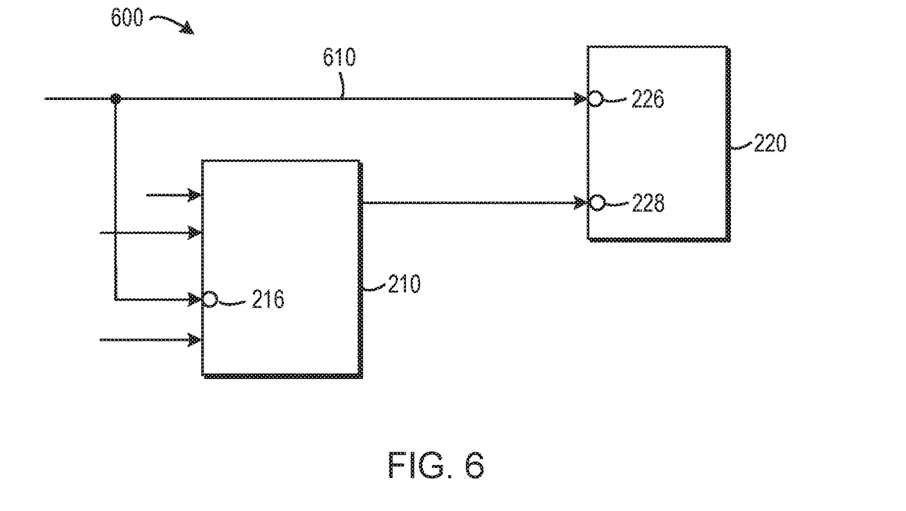
FIG. 6 shows a schematic diagram of two devices having a signal cut-off possibility in a path of circuit design, according to an embodiment of the present invention.

A specific example will be described with reference to FIG. 6. In the example shown in FIG. 6, suppose the input 216 of the first device 210 and the input 226 of the second device 220 in the path 600 are directly connected through the same wire 610 (or associated with one or more same common registers, not shown in the figure). Moreover, as shown in the figure, the first device 210 is located upstream with respect to the second device 220 in the path 600. It is further supposed that the condition for the first device 210 to reach the maximum device delay is that the input value of the input 216 is "1." Therefore, when the first device 210 reaches the maximum device delay, the input value of the input 226 of the second device 220 is also naturally "1." If the second device 220 comprises an OR gate, then regardless of what value is fed from the first device 210 to the input 228 of the second device 220, the output of the second device 220 will be "1."

In other words, in this case, the output of the first device 210 is cut off by the second device 220. Therefore, a delay signal of the path 600 will essentially not be subjected to the impact of the path delay of the first device 210. Correspondingly, in this case, device delay of the first device 210 may be excluded when calculating the path delay.

Similarly, when the second device 220 comprises an AND gate, the output of the first device may be likewise cut off. For example, if the condition for the first device 210 to reach the maximum device delay is that the input value of the input 216 is "0," then the input of the first device 220 will be surely cut off by the second device 220. The reason is that when the input value of the input 216 of the first device 210 is "0," the input value of the input 226 of the second device 220 must also be "0." Therefore, the output of the second device 220 will be surely 0. In this case, the device delay of the first device 210 may be excluded from the path delay calculation.

It should be noted that the second device 220 is not necessarily the OR gate or the AND gate per se. Actually, as long as the second device 220 can perform the "AND" operation or "OR" operation, the signal in the path may be cut off. For example, the second device 220 may be a NAND gate, NOR gate, AND OR gate, or any other device comprising an OR gate and/or AND gate.

Under the scenarios described above, if it is determined that the output of the first device will be cut off by the second device when the first device delay reaches a given value, then in step S320, a third delay constraint may be generated, which excludes a possibility that the first device takes the given value when calculating the path delay.

It would be appreciated that although several examples of delay constraints have been described above, these examples are only illustrative, not intended to limit the protection scope of the present invention in any manner. Any other appropriate delay constraint and its generating manner are feasible. For example, alternatively or additionally, in one embodiment, any known or future developed analysis engines may be used to scan a logic cone or its part in the circuit.

As already known, a logic cone refers to a combined circuit that needs to determine the signal logic, which may be expressed by a Boer expression. By scanning the logic cone (or a part thereof), an input pattern that unlikely occurs in the circuit or its given path may be determined, i.e., an infeasible input pattern. Additionally, for example, by accessing the standard cell library, a first set of input patterns corresponding to candidate values of device delays of the first device and a second set of input patterns corresponding to the candidate values of the device delays of the second device may be obtained. Based on the infeasible input pattern, the first set of input patterns, and the second set of input patterns, a delay constraint associated with the first device and second device may be generated. Specifically, the infeasible input pattern may be excluded from the first set of input patterns and the second set of input patterns, to remove those input patterns (if available) that are included in the infeasible input pattern. In this manner, candidate values of corresponding device delays may be excluded when calculating the path delay.

Still with reference to FIG. 3, the method 300 proceeds to step S330, where respective device delays of the first device and the second device which satisfy the delay constraint obtained in step S320 are used to calculate the path delay of the entire path.

It would be appreciated that according to embodiments of the present invention, different types of delay constraints may be used separately or in any combination. In one embodiment, one or more delay constraints generated in step S320 may be stored in a constraint file of any appropriate format. Correspondingly, in step S330, the constraint file may be accessed, and the value pair of those devices conflicting with the constraint file are excluded from the path delay calculation.

For example, in one embodiment, in step S320, it may be first supposed that all devices reach the maximum device delay indicated by the standard cell library. Afterwards, it may be checked whether such supposition violates a delay constraint. If it is determined that some devices cannot reach the maximum device delay simultaneously based on relevant delay constraint, other candidate values may be selected from the standard cell library, such that the value pair of the device delay satisfies the delay constraint.

Compared with the traditional solution of calculating the path delay based on the maximum device delay of each device, embodiments of the present invention may substantially reduce the pessimism of path delay calculation. For example, experiments showed that the use of only the first delay constraint may exclude a considerable number of impossible scenarios where the connected devices reach the maximum device delay.

It may be understood that although the above description with reference to FIG. 3 emphatically discusses the maximum device delay, it is only exemplary, not intended to limit the scope of the present invention in any manner. In other embodiments, when calculating the path delay, it may be determined whether any candidate value of device delay that is stored in the standard cell library may be excluded based on the delay constraint.

Additionally, according to embodiments of the present invention, the method 300 described above with reference to FIG. 3 may be applied at the start of the STA process. Alternatively, in order to satisfy more the needs of a practical application, the connectivity-based delay constraint may be used in combination with the traditional STA method.

Figure 7:
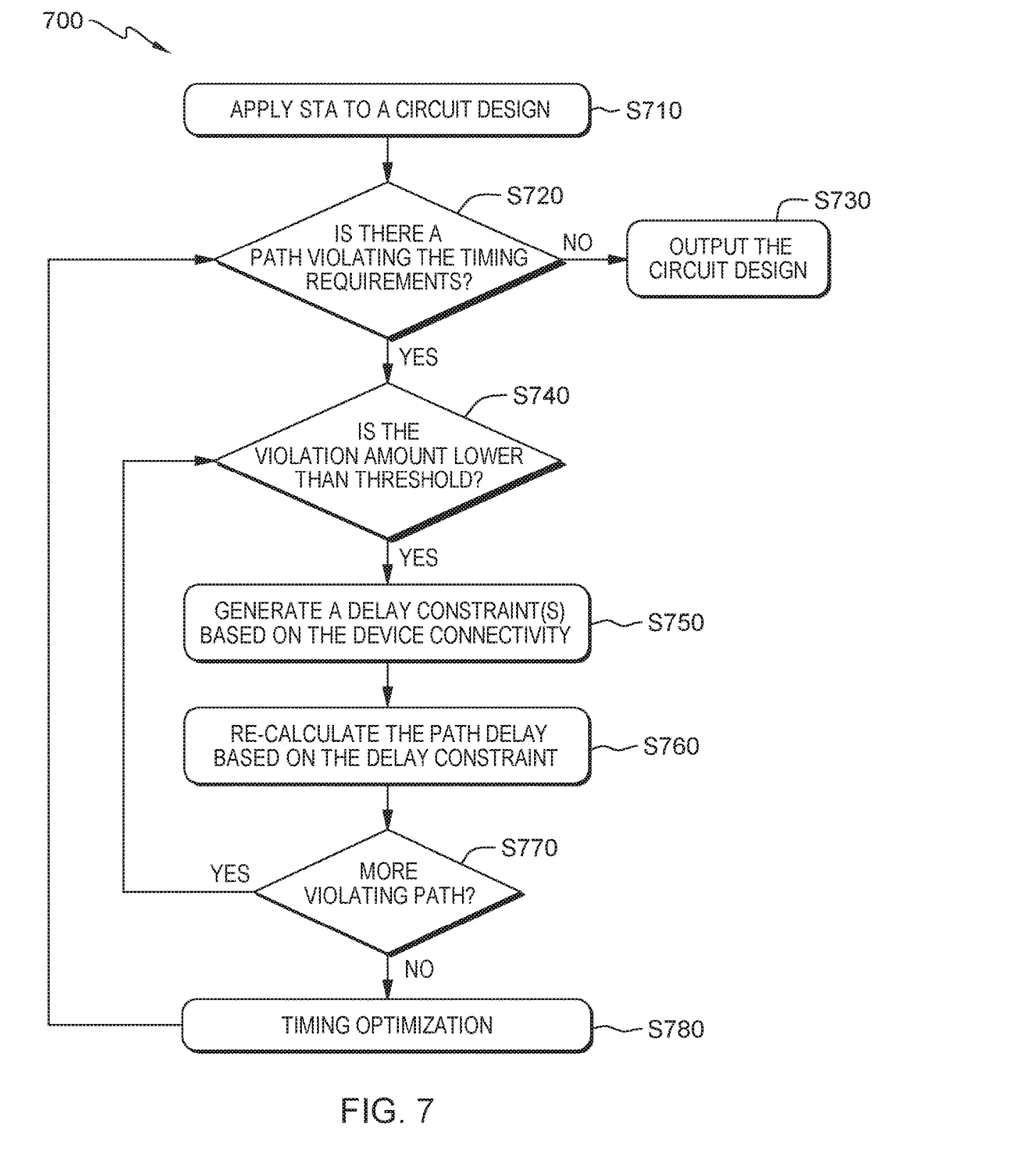
FIG. 7 shows a schematic flow diagram of a method of leveraging connectivity-based delay constraint and an STA in combination, according to an embodiment of the present invention.

Referring now to FIG. 7, a schematic flow diagram of a method 700 of combining the connectivity-based delay constraint and the traditional STA is shown, according to embodiments of the present invention.

The method 700 starts from step S710, in which an STA process is applied to a circuit design. For example, in one embodiment, during the STA process, it may be supposed that all devices in the circuit reach their maximum device delays, thereby obtaining path delay of each path. The path delay may be compared with a predefined timing requirement, to determine whether the path violates it or not. In other words, if the previous path delay (a path as determined in the previous STA) is greater than the desired delay specified by the timing requirement, then it is determined that the path violates the timing requirement. The STA will return one or more paths (if available) that do not satisfy timing design requirements.

The method 700 proceeds to step S720, in which it is determined whether the circuit includes a path violating the timing requirements. If all paths satisfy the timing requirements (branch "No"), the method 700 proceeds to step S730, where the circuit design is output. Otherwise, if the circuit includes one or more paths violating the timing requirements (branch "Yes"), the method 700 proceeds to step S740, where it is determined whether the time amount of the path delay of one of the violating paths exceeds the desired delay specified in the timing requirement in the previous STA. In other words, the time amount of the path delay of one of the violating paths is lower than a threshold.

If the time amount of the previous path delay of the violating path exceeding the desired delay is below the threshold (branch "Yes"), the method 700 proceeds to step S750, where a delay constraint(s) is generated based on the connectivity of the devices. The step S750 corresponds to steps S310 and S320 in the method 300 described above.

It may be understood that in the method 700, only when the gap between the previous path delay of the violating path determined in the initial STA and the desired delay specified by the timing requirement is small enough, will the connectivity-based delay constraint be initiated. The reason is that when the path seriously violates the timing requirements, the delay constraint may not amend the pessimism in path delay calculation since the help of timing optimization may not always be apparent. In this case, the delay constraint-based amendment may not be initiated for now; instead, the violating path is directly subject to timing optimization. Through one or more rounds of optimizations, when the violating amount drops below the threshold, the pessimism may be eliminated based on a delay constraint, thereby implementing the timing optimization more effectively and efficiently.

After step S750, the method proceeds to step S760, where the path delay of the violating path is re-calculated based on the delay constraint obtained in step S750. Specifically, as mentioned above, for the first device and second device connected to each other, it may be determined, with reference to the delay constraint, whether they could reach the maximum device delays under the current connectivity. If not, the path delay may be re-calculated by updating the device delays of the first device and/or second device, thereby amending the result of the initial STA.

In step S770, it is determined whether there are more violating paths that have not been processed yet. In the case of yes, the method 700 returns to step S740 so as to continue processing. On the other hand, if it is determined that all violating paths have been processed in step S740, the method 700 performs timing optimization to the violating paths in step S780. It would be appreciated that in the violating paths processed in step S780, there might include those violating paths whose violation amount exceeds the threshold without recalculating the path delay, or include violating paths whose violation amount is lower than the threshold and thus whose path delay is recalculated in steps S750 and S760.

After step S780, the method 700 may return to step S720, where it is determined whether the circuit design after timing optimization still includes violating paths. If violating paths still exist, one or more round of further optimization may be performed. In this way, through one or more iterations, timing optimization of circuit design can be accomplished more effectively and accurately, so as to eliminate the violating paths.

Figure 8:
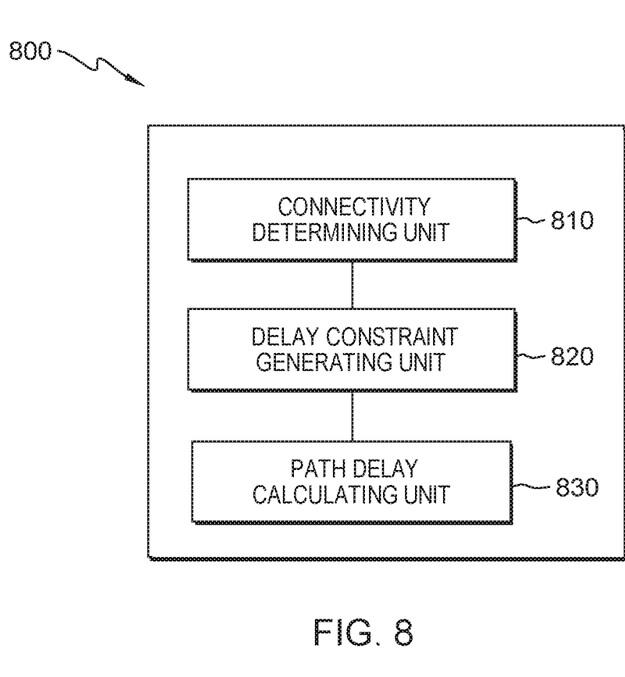
FIG. 8 shows a schematic block diagram of a system for calculating a path delay in an STA, according to an embodiment of the present invention.

Referring now to FIG. 8, a schematic block diagram of a system for calculating a path delay in an STA is shown, according to embodiments of the present invention. As described in the figure, the system 800 comprises: connectivity determining unit 810 configured to determine connectivity between a first device and a second device in a path of the circuit design; a delay constraint generating unit 820 configured to generate a delay constraint associated with the first device and the second device based on the connectivity, the delay constraint specifying a correlation between a first device delay of the first device and a second device delay of the second device; and a path delay calculating unit 830 configured to calculate a path delay of the path based on the first device delay and the second device delay satisfying the delay constraint.

In one embodiment, the delay constraint generating unit 820 may include: a first delay constraint generating unit configured to generate a first delay constraint in response to a first input of the first device being directly connected to a second input of the second device, the first delay constraint specifying that an input value of the first input corresponding to the first device delay should be identical to an input value of the second input corresponding to the second device delay.

In one embodiment, the delay constraint generating unit 820 may include: a second delay constraint generating unit configured to generate a second delay constraint in response to a third input of the first device and a fourth input of the second device being associated with a common register, the second delay constraint specifying that a first status of the register corresponding to the first device delay and a second status of the register corresponding to the second device delay should be identical.

In one embodiment, the delay constraint generating unit 820 may include: a device type-based delay constraint generating unit configured to generate the delay constraint based on the connectivity and a device type of at least one of the first device and the second device. In one embodiment, the first device is located upstream with respect to the second device in all paths. In this case, the device type-based delay constraint generating unit includes: a third delay constraint generating unit configured to generate a third delay constraint if an output of the first device will be cut off by the second device when the first device delay reaches a given value, the third delay constraint excluding a possibility of assigning the given value to the first device delay. In such an embodiment, the second device may be a device supporting "OR" operation or "AND" operation.

In one embodiment, the delay constraint generating unit 820 may include: an infeasible input pattern determining unit configured to determine an infeasible input pattern in the circuit design by scanning at least a part of a logic cone of the circuit design; a first input pattern obtaining unit configured to obtain a first set of input patterns corresponding to candidate values of the first device delay; a second input pattern obtaining unit configured to obtain a second set of input patterns corresponding to candidate values of the second device delay; and an input pattern-based delay constraint generating unit configured to generate the delay constraint by excluding the infeasible input pattern from the first set of input patterns and second set of input patterns.

In one embodiment, a previous path delay of the path in a previous STA exceeds a desired delay specified by the timing requirement. In this embodiment, the system 800 may further include: a violation amount comparison unit configured to compare a time amount that the previous path delay exceeds the desired delay with a predetermined threshold. The connectivity determining unit 810 may be configured to determine the connectivity of the first device and the second device only when the time amount is below the predetermined threshold.

In one embodiment, in the previous STA, the first device delay is a maximum device delay of the first device, and the second device delay is the maximum device delay of the second device. In this embodiment, the path delay calculating unit 830 may include: a path delay re-calculating unit configured to re-calculate a path delay of the path by updating at least one of the first device delay and the second device delay in response to a violation of the delay constraint in the previous STA.

In one embodiment, the system 800 may further include: a timing sequence optimizing unit configured to perform timing optimization to the path based on the re-calculated path delay.

It should be noted that for the sake of clarity, FIG. 8 does not show optional units or sub-units included in the system 800. All features and operations as described above are suitable for system 800, respectively, which are therefore not detailed here. Moreover, partitioning of units or subunits in system 800 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 800 may be implemented by various manners, including software, hardware, firmware or a random combination thereof. For example, in some embodiments, the apparatus may be implemented by software and/or firmware. Alternatively or additionally, the system 800 may be implemented partially or completely based on hardware. for example, one or more units in the system 800 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving path delay calculation in static timing analysis (STA) for a circuit design, the method comprising:
  determining, by a processor, a connectivity between a first device and a second device located in a path of the circuit design, wherein a previous path delay of the path in a previous STA exceeds a desired delay specified by a timing requirement, and wherein determining the connectivity between the first device and the second device in the path of the circuit design comprises:
    comparing a time amount that the previous path delay exceeds the desired delay with a predetermined threshold, and
    determining the connectivity of the first device and the second device in response to the time amount being below the predetermined threshold;

generating, by a processor, a delay constraint associated with the first device and the second device based on the connectivity, the delay constraint specifying a correlation between a first device delay of the first device and a second device delay of the second device;

calculating, by a processor, a path delay of the path based on the first device delay and the second device delay that satisfies the delay constraint; and performing, by a processor, timing optimization to the path based on the calculated path delay.

2. The method according to claim 1, wherein generating the delay constraint associated with the first device and the second device based on the connectivity comprises:

generating a first delay constraint in response to a first input of the first device being directly connected to a second input of the second device, the first delay constraint specifying that an input value of the first input corresponding to the first device delay is identical to an input value of the second input corresponding to the second device delay.

3. The method according to claim 1, wherein generating the delay constraint associated with the first device and the second device based on the connectivity comprises:

generating a second delay constraint in response to a third input of the first device and a fourth input of the second device being associated with a common register, the second delay constraint specifying that a first status of the common register corresponding to the first device delay and a second status of the common register corresponding to the second device delay are identical.

4. The method according to claim 1, wherein generating the delay constraint associated with the first device and the second device based on the connectivity comprises:

generating the delay constraint based on the connectivity and a device type of at least one of the first device and the second device.

5. The method according to claim 4, wherein the first device is located upstream with respect to the second device in the path, and wherein generating the delay constraint based on the connectivity and a device type of at least one of the first device and the second device comprises:

generating a third delay constraint in case that an output of the first device will be cut off by the second device if the first device delay is a given value, the third delay constraint excluding a possibility of assigning the given value to the first device delay.

6. The method according to claim 5, wherein the second device is a device enabling at least one of "OR" and "AND" operations.

7. The method according to claim 1, wherein generating the delay constraint associated with the first device and the second device based on the connectivity comprises:

determining an infeasible input pattern in the circuit design by scanning at least a part of a logic cone of the circuit design;

obtaining a first set of input patterns corresponding to candidate values of the first device delay;

obtaining a second set of input patterns corresponding to candidate values of the second device delay; and generating the delay constraint by excluding the infeasible input pattern from the first set of input patterns and the second set of input patterns.

8. The method according to claim 1, wherein in the previous STA, the first device delay is a maximum device delay of the first device and the second device delay is the maximum device delay of the second device, and wherein calculating the path delay of the path based on the first device delay and the second device delay satisfying the delay constraint comprises:

recalculating the path delay of the path by updating at least one of the first device delay and the second device delay in response to a violation of the delay constraint in the previous STA.

9. A system for improving path delay calculation in static timing analysis (STA) for a circuit design, the system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining a connectivity between a first device and a second device located in a path of the circuit design, wherein a previous path delay of the path in a previous STA exceeds a desired delay specified by a timing requirement, and wherein determining the connectivity between the first device and the second device in the path of the circuit design comprises:

comparing a time amount that the previous path delay exceeds the desired delay with a predetermined threshold, and determining the connectivity of the first device and the second device in response to the time amount being below the predetermined threshold;

generating a delay constraint associated with the first device and the second device based on the connectivity, the delay constraint specifying a correlation between a first device delay of the first device and a second device delay of the second device;

calculating a path delay of the path based on the first device delay and the second device delay that satisfies the delay constraint; and performing timing optimization to the path based on the calculated path delay.

10. The system according to claim 9, wherein generating the delay constraint associated with the first device and the second device based on the connectivity comprises:

generating a first delay constraint in response to a first input of the first device being directly connected to a second input of the second device, the first delay constraint specifying that an input value of the first input corresponding to the first device delay is identical to an input value of the second input corresponding to the second device delay.

11. The system according to claim 9, wherein generating the delay constraint associated with the first device and the second device based on the connectivity comprises:

generating a second delay constraint in response to a third input of the first device and a fourth input of the second device being associated with a common register, the second delay constraint specifying that a first status of the common register corresponding to the first device delay and a second status of the common register corresponding to the second device delay are identical.

12. The system according to claim 9, wherein generating the delay constraint associated with the first device and the second device based on the connectivity comprises:

generating the delay constraint based on the connectivity and a device type of at least one of the first device and the second device.

13. The system according to claim 12, wherein the first device is located upstream with respect to the second device in the path, and wherein generating the delay constraint based on the connectivity and a device type of at least one of the first device and the second device comprises:
    generating a third delay constraint in case that an output of the first device will be cut off by the second device if the first device delay is a given value, the third delay constraint excluding a possibility of assigning the given value to the first device delay.

14. The system according to claim 13, wherein the second device is a device enabling at least one of "OR" and "AND" operations.

15. The system according to claim 9, wherein generating the delay constraint associated with the first device and the second device based on the connectivity comprises:
    determining an infeasible input pattern in the circuit design by scanning at least a part of a logic cone of the circuit design;
    obtaining a first set of input patterns corresponding to candidate values of the first device delay;
    obtaining a second set of input patterns corresponding to candidate values of the second device delay; and
    generating the delay constraint by excluding the infeasible input pattern from the first set of input patterns and the second set of input patterns.

16. The system according to claim 9, wherein in the previous STA, the first device delay is a maximum device delay of the first device and the second device delay is the maximum device delay of the second device, and wherein calculating the path delay of the path based on the first device delay and the second device delay satisfying the delay constraint comprises:
    recalculating the path delay of the path by updating at least one of the first device delay and the second device delay in response to a violation of the delay constraint in the previous STA.

* * * * *